United States Patent [19]

Lohneis et al.

[11] Patent Number: 4,679,970
[45] Date of Patent: Jul. 14, 1987

[54] HIGH SPEED TOOLHOLDER FOR A MACHINING CENTER

[75] Inventors: Earl R. Lohneis, Milwaukee; Robert T. Woythal, West Allis, both of Wis.

[73] Assignee: Kearney & Trecker Corporation, West Allis, Wis.

[21] Appl. No.: 296,333

[22] Filed: Aug. 26, 1981

[51] Int. Cl.⁴ .............................................. B23B 47/14
[52] U.S. Cl. ....................................... 408/128; 29/568; 74/606 A; 408/57; 409/135
[58] Field of Search ................... 408/124, 128, 56–61; 409/135, 136, 144, 230; 279/1 TS; 51/166 MH; 29/568; 74/606 A

[56] References Cited

U.S. PATENT DOCUMENTS

| | | | |
|---|---|---|---|
| 1,090,383 | 3/1914 | Cantrell et al. | 74/606 A |
| 1,416,777 | 5/1922 | Bayrer | 408/128 |
| 2,777,340 | 1/1957 | Hettwer et al. | 408/124 |
| 3,555,962 | 1/1971 | Wolf | 409/135 |
| 3,736,812 | 6/1973 | Wellauer | 74/606 A |
| 3,752,595 | 8/1973 | Woythal et al. | 408/124 |
| 3,934,396 | 1/1976 | Stahlecker et al. | 74/606 A |
| 3,981,606 | 9/1976 | Nashold | 408/124 |
| 4,077,736 | 3/1978 | Hutchens | 29/568 |

FOREIGN PATENT DOCUMENTS

| | | | |
|---|---|---|---|
| 15248 | 9/1980 | European Pat. Off. | 409/135 |
| 557714 | 1/1975 | Switzerland | 408/128 |
| 844859 | 7/1981 | U.S.S.R. | 74/606 A |

OTHER PUBLICATIONS

Sales literature Ex-Cell-O Corp., Workcenter Operations Div., Howall, MI, "Workcenter ® Model 108B".
Sales literature Ex-Cell-O Corp., Byrant Grinder Div., Springfield, VT, "Spindles for Hi-speed Machining".
Sales literature Speedline Industries, Mt. Clemens, MI, "Speedmill Attachment".

Primary Examiner—Nicholas P. Godici
Assistant Examiner—Jerry Kearns
Attorney, Agent, or Firm—Quarles & Brady

[57] ABSTRACT

A high speed toolholder for driving a small high speed cutting tool from the large slow speed spindle of a machining center comprises a housing having a retention pin extending from side end thereof. An input shaft, dimensioned to be received in the machining center spindle, is rotatably journaled into the toolholder housing parallel to the retention pin. Rotatably journaled into the opposite side of the housing so as to be coaxial with the input shaft is an output shaft whose distal end has a tapered bore therein dimensioned to receive the shank of a high speed cutting tool. Within the housing, each of the input and output shaft carry a separate one of a pair of sheaves which are each lined by a V-belt to a separate one of a pair of sheave members on a step sheave rotatably journaled in the housing parallel to the input and output shaft. When the housing is positioned adjacent to the spindle so that the input shaft firmly seats into the spindle and the retention pin seats in a bore the machine tool spindlehead, rotational energy is transmitted from the spindle to the output shaft to rotatably drive the cutting tool therein at a speed several times greater than the spindle speed.

1 Claim, 5 Drawing Figures

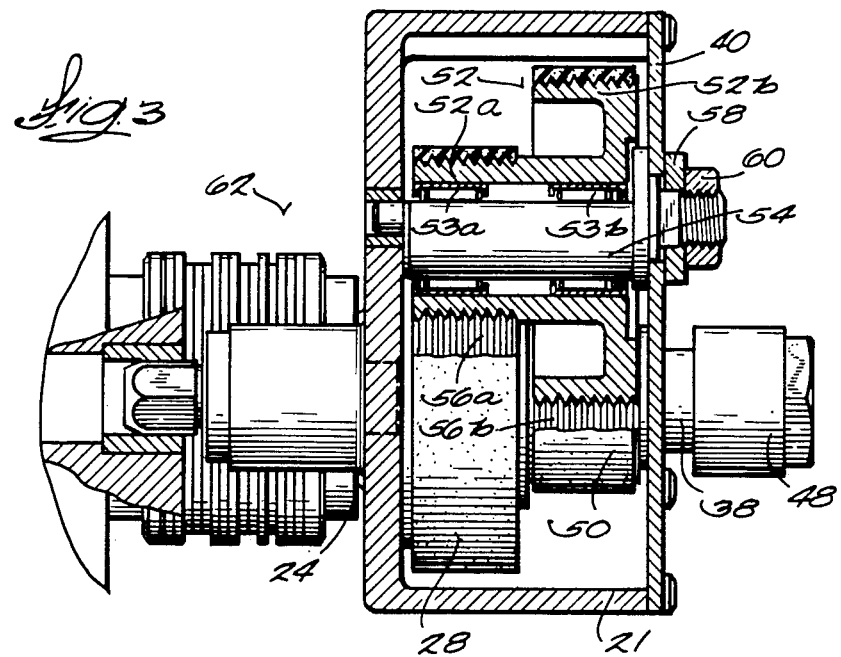
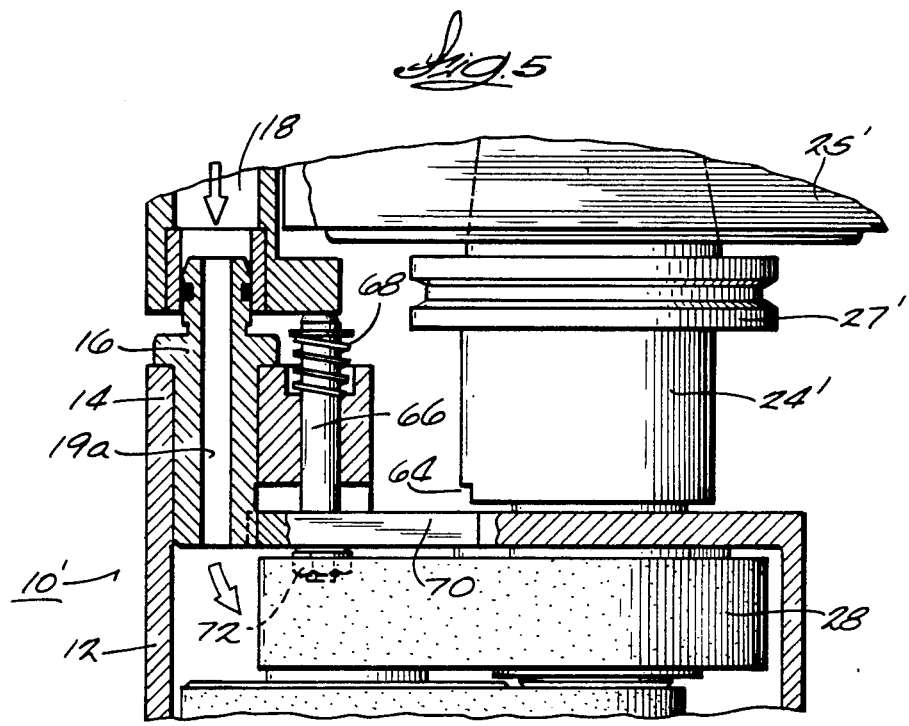

HIGH SPEED TOOLHOLDER FOR A MACHINING CENTER

BACKGROUND OF THE INVENTION

This invention relates generally to automatic tool-changing machining centers, and more particularly, to a high speed toolholder for rotatably driving a high speed cutting tool from the machining center spindle at a speed several times greater than the machining center spindle speed.

Substitution of automatic tool changing, computer numerically controlled (CNC) machining centers, such as are well known in the art, in place of conventional, manually operated single purpose machine tools for the low and midvolume production of machined parts results in increased part productivity. By substituting automatic tool changing CNC machining centers for conventional single purpose manually operated machine tools, uniform part production can virtually be assured because each part can be machined precisely in accordance with a single computer program. Further, by employing automatic tool changing machining centers for production of machined parts, different machining operations can be completed on a single part without the need to manually change the tools or transfer the part to another machine, thus allowing more parts to be produced in a given period of time. Since automatic tool changing machining centers can operate unattended for long periods of time, little or no direct supervision is required, thereby reducing direct labor costs.

Present day automatic tool changing machining centers have a rotary driven spindle which is configured to receive a wide variety of cutting tools, thereby permitting completion of various types of machining operations. To prevent radial and axial spindle deflection caused by high cutting forces, the spindle of such automatic tool changing machining centers is typically made very stiff both radially and axially. High spindle stiffness results in a high static and dynamic frequency which are also very desirable. Typically, the physical size of the spindle is fixed in accordance with the type of tooling used. Large, slow speed cutting tools require a large spindle capable of transmitting a large torque while resisting high axial and radial forces. Conversely, small high speed cutting tools require a smaller spindle capable of rotating at high speeds without generating excessive heat. Heretofore, a single machine tool spindle has not been configured which can utilize both large, slow speed cutting tools and small, high speed cutting tools. To accommodate both types of cutting tools, it is heretofore been necessary to utilize two spindles, a main large, slow speed spindle for accommodating large, slow speed cutting tools and a second, smaller high speed rotary driven tool carrying spindle which is typically stored in the machine tool spindlehead adjacent to the main spindle. When high speed machining is desired, the high speed spindle is loaded from its storage position into the main spindle by a spindle change arm separate from the tool change arm which transfers the large, slow speed cutting tools between the tool storage magazine and the main spindle. While the above described arrangement facilitates the use of both large, slow speed cutting tools and small, high speed cutting tools, it is subject to disadvantage that machine complexity and costs are increased due to the need for a separate spindle, and a separate spindle change arm for transferring the high speed spindle from its storage position to the main machine tool spindle.

In contrast, the present invention concerns a high speed toolholder capable of being stored in the machine tool storage magazine and being handled by the automatic tool changer for driving a small, high speed cutting tool from a large, slow speed spindle at a speed several times greater than the spindle speed.

It is an object of the present invention to provide a toolholder for driving a small, high speed cutting tool from the large, slow speed spindle of a machine tool.

It is another object of the present invention to provide a toolholder for driving a small, high speed cutting tool from the large, slow speed spindle of a machine tool at a speed several times greater than the spindle speed.

It is yet another object of the present invention to provide a toolholder capable of being stored in the tool storage magazine and being handled by an automatic tool changer for driving a small high speed cutting tool from the large, slow speed machine tool spindle at a speed several times greater than the spindle speed.

BRIEF SUMMARY OF THE INVENTION

Briefly, in accordance with the preferred embodiment of the invention, a high speed toolholder for rotatably driving a small, high speed cutting tool from the large, slow speed spindle of a machine tool, such as an automatic tool changing machining center, comprises a housing capable of being stored in the tool storage magazine. Extending perpendicularly from the one side of the housing is a hollow retention pin which is dimensioned complementary to a bore in the machining center spindlehead adjacent to the spindle so as to duct compressed air from the machine tool into the housing. An input shaft, dimensioned complementary to the machine tool spindle to enable it to be gripped by the machine tool automatic tool changer, is rotatably journaled into housing parallel to the retention pin so as to extend beyond the housing for insertion into the spindle bore. When the input shaft is seated in the spindle bore, the retention pin engages the complementary bore in the machining center spindlehead to prevent the housing from rotating when the input shaft is rotatably driven by the spindle. An output shaft, having a bore in one end thereof receiving the shank of a high speed cutting tool, is rotatably journaled at its opposite end into the housing so as to be opposite to, and coaxial with the input shaft. Rotatably journaled within the housing parallel to each of the input and output shafts is a step sheave which has a pair of different size sheave members thereon, each sheave member being opposite to a separate one of a pair of sheaves each keyed on the input and output shafts, respectively. A pair of poly V-belts each link a separate one of the sheave members on the step sheave to each of the sheaves on the input and output shafts, respectively. The sheave members on the step sheave and the sheaves on each of the input and output shafts each have a pitch diameter such that when the input shaft is rotatably driven by the machine tool spindle, rotational energy is transmitted from the input shaft to the output shaft to rotatably drive the output shaft at a speed several times greater than the spindle speed.

BRIEF DESCRIPTION OF THE DRAWINGS

The features of the invention believed to be novel are set forth with particularity in the appended claims. The invention itself, however, both as to organization and method of operation, together with further objects and advantages thereof may best be understood by reference to the following description taken in conjunction with the accompanying drawings in which:

FIG. 3 is a cross-sectional view of the high speed toolholder of FIG. 2 taken along lines 3—3 thereof;

FIG. 5 is a cross-sectional view of an alternate embodiment of a high speed toolholder constructed in accordance with the teachings of the present invention.

DETAILED DESCRIPTION OF THE PREFERRED EMBODIMENT

Figure 1:
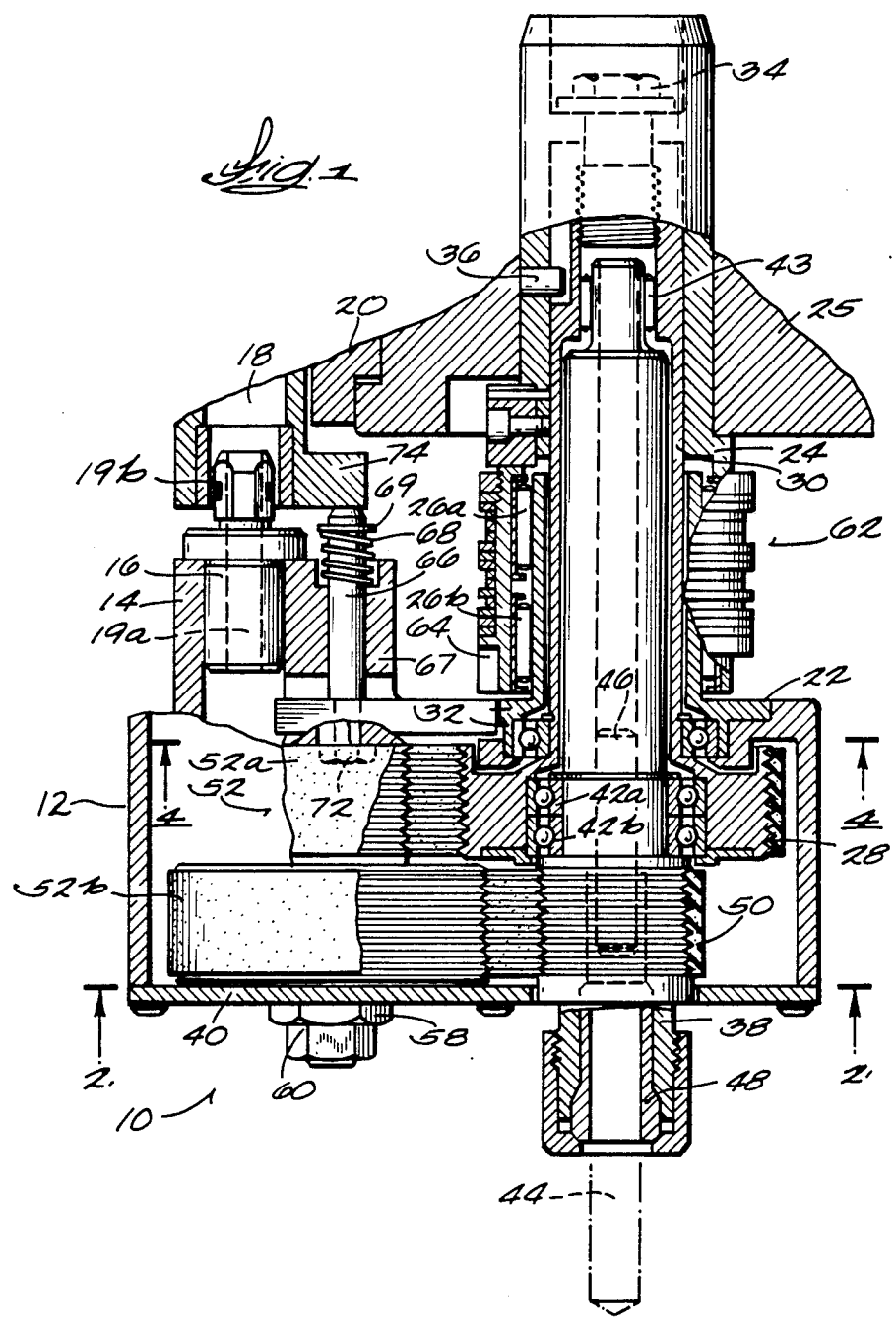
FIG. 1 is a front view of a high speed toolholder in accordance with the teachings of the present invention.

Referring to FIG. 1, there is illustrated a high speed toolholder 10 configured in accordance with the present invention. High speed toolholder 10 comprises a housing 12 having a hollow projection 14 extending vertically, as viewed in FIG. 1, from the top side of the housing. In practice, housing 12 is dimensioned to be stored in the tool storage magazine of the machine tool (not shown). A retention pin 16 is pressed into the bore of projection 14 so as to extend therebeyond for mating engagement in a complementary bore 18 in the spindlehead 20 of the machine tool which is typically a vertical or horizontal spindle automatic tool changing machining center such as are well known in the art. In the presently preferred embodiment, retention pin 16 has a hollow bore 19a disposed longitudinally therethrough so as to be in communication with housing 12 for ducting compressed air expelled from the machine tool through bore 18 into the housing. The compressed air ducted through the hollow bore in pin 16 serves to cool the later described rotating components within the housing. An O-ring 19b circumscribes the end of retention pin 16 to provide a seal between the retention pin and bore 18 in the machine tool spindlehead. Attached to the top surface of housing 12 so as to be flush therewith, is a hollow bore bearing adapter 22 which extends from housing 12 parallel to projection 14 and retention pin 16.

An input shaft 24 is rotatably journaled about the periphery of bearing adapter 22 by a pair of high speed roller bearings 26a and 26b. In the presently preferred embodiment, input shaft 24 is straight for mating engagement in a straight shank spindle 25 and for gripping by the automatic tool change mechanism (not shown) of the machining center. Disposed within housing 12 coaxial with input shaft 24 is a sheave 28 having a shaft 30 integrated thereto and extending into a complementary bore disposed through input shaft 24 along its longitudinal axis. A ball bearing 32 rotatably journals sheave shaft 30 to housing 12. Shaft 30 is secured to input shaft 24 by a shoulder screw 34 which is threaded into the upward end of the drive shaft to urge drive shaft 30 against a pair of projections which extend from the walls of the interior bore through input shaft 24. A set screw 36 is threaded through input shaft 24 to bear against shaft 30 to prevent shaft 30 from rotating relative to input shaft 24.

An output shaft 38 is disposed through a cover 40 fastened to, and overlying the opening through the bottom of housing 12. The output shaft extends through the cover into a bore disposed in drive sheave shaft 30 along its central axis. A pair of radial thrust ball bearings 42a and 42b rotatably journal output shaft 38 to sheave 28 while a single radial thrust roller bearing 43 rotatably journals the end of output shaft 38 to sheave shaft 30. Output shaft 38 has a bore extending therethrough along its central axis which is dimensioned to receive the shank of a high speed cutting tool 44. An adjustable screw 46 is threaded into the bore in output shaft 38 near its end and serves as a depth stop for cutting tool 44. Cutting tool 44 is firmly engaged in the bore in output shaft 38 by a tapered compression bushing 48 which threadedly engages output shaft 38 adjacent to its bottom end to urge the output shaft radially inward against the shank of the cutting tool.

Figure 2:
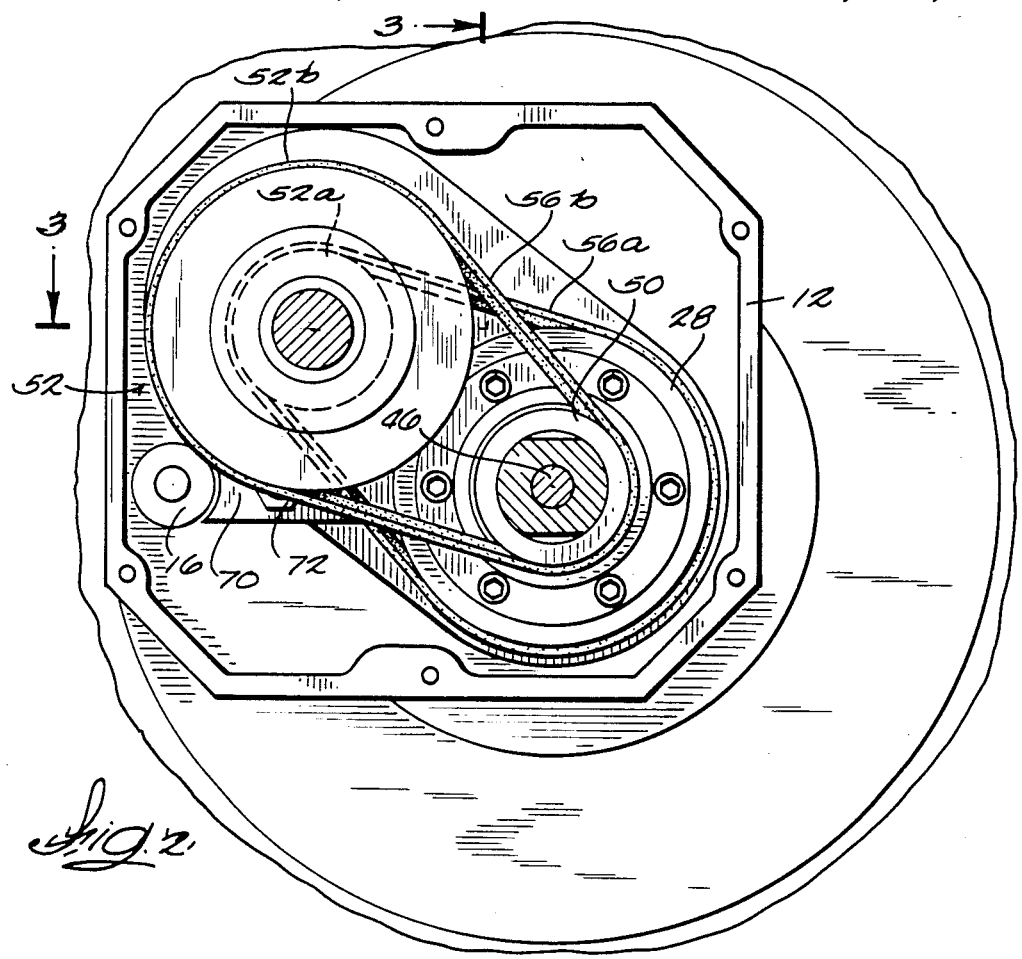
FIG. 2 is a cross-sectional view of the high speed toolholder of FIG. 1 taken along lines 2—2 thereof.

Keyed on output shaft 38 opposite to drive sheave 28 is an output sheave 50. Drive sheave 28 and output sheave 50 are each opposite to a separate one of the sheave members 52a and 52b, respectively, of a step sheave 52 which is rotatably journaled by a pair of roller bearings 53a and 53b (FIG. 3) about an eccentric shaft 54 (FIG. 3) journaled in housing 12 parallel to output shaft 38 and shaft 30. Referring now to FIG. 2, each of sheave members 52a and 52b on step sheave 52 is linked by a separate one of poly V-belts 56a and 56b, respectively, to a corresponding one of drive sheave 28 and output sheave 50, respectively. In this way, the rotational energy imparted to the input shaft by machine tool spindle is transferred via drive sheave 28 and V-belt 56a to step sheave 52. In turn, the rotational energy imparted to step sheave 52 is transferred via poly V-belt 56b to output sheave 50. In the presently preferred embodiment, the pitch diameter of drive sheave 28 is one-half the pitch diameter of sheave member 52a on step sheave 52 so that step sheave 52 is rotatably driven by poly V-belt 56a at a speed twice as fast as the rotational speed of drive sheave 28. Conversely, the pitch diameter of output sheave 50 is one-half the pitch diameter of sheave member 52b on step sheave 52 so that when output sheave 50 is rotatably driven by poly V-belt 56b, output sheave 50 rotates at a speed twice as fast as the rotational speed of step sheave 52. Thus, when sheaves 28 and 50 and sheave members 52a and 52b of step sheave 52 are dimensioned as described above, output sheave 50 rotates at a speed four times as fast as that of drive sheave 28, allowing output shaft 38 and the high speed cutting tool held therein to be rotatably driven at a speed four times greater than the spindle speed. By dimensioning sheaves 28 and 50 and sheave members 52a and 52b of step sheave 52 differently, a different ratio between input shaft speed to output shaft speed may be obtained. In practice, a 4:1 speed ratio between output shaft speed and input shaft speed has been found most satisfactory.

Referring now to FIG. 3, eccentric shaft 54, about which step sheave 52 is rotatably journaled by roller bearings 53a and 53b, is journaled into housing 12 so that one end of shaft 54 extends therebeyond through housing cover 40. A tension adjuster 58, taking the form of a thin plate having a hexagonal head (as illustrated in FIG. 1) which has a square bore therethrough, is carried on a flatted segment of shaft 54 extending beyond cover 40 so that the tension adjuster is in face-to-face relationship with cover 40. When tension adjuster 58 is twisted by a wrench or the like, the tension adjuster imparts a torque to shaft 54. Shaft 54 will, by virtue of its eccentricity, be displaced laterally from its previous position when rotated by the tension adjuster, causing step sheave 52 to be displaced laterally from sheaves 28 and 50 which causes a corresponding change in belt tension. A locking nut 60 engages the threads on the distal end of shaft 54 extending from cover 40 to urge tension adjuster 58 against the cover so as to prevent eccentric movement of shaft 54 during operation.

As is best illustrated in FIGS. 1 and 3, input shaft 24 carries a set of code rings 62 thereon adjacent to the top of housing 12. Code rings 62 are arranged so that when the rings come into contact with a tool reader switch (not shown) located on the machining center adjacent to the tool storage magazine (not shown) in which high speed toolholder 10 is stored, the tool reader switch outputs a digital signal which is recognized by the machine tool control system (not shown) as being indicative of the type of high speed toolholder secured in the bore of output shaft 38 by compression bushing 48. For a further, more complete understanding of the concept of tool identification using code rings secured on the toolholder, reference should be had to U.S. Pat. No. 3,176,847 issued to R. K. Sedgwick on Apr. 6, 1965.

Referring now to FIG. 1, a keyway 64 is inscribed radially into the periphery of code ring 62 near the bottom thereof. Keyway 64 is angularly displaced from the keyway (not shown) carried on input shaft 24 so that when the keyway on the input shaft is aligned with the spindle key when the spindle is at the spindle key lock position, keyway 64 is directly aligned with a plunger 66 that is slidably disposed in a bore formed in an overhanging arm 67 integrated to projection 14 of housing 12 parallel to retention pin 16. Plunger 66 is urged outwardly of arm 67 by compression spring 68 which is coaxial with the plunger so as to be interposed between an annular ring 69 integrated near the top of the plunger, and the bottom wall of a bore disposed in the overhanging arm coaxial with the bore therein which receives plunger 66.

Figure 4:
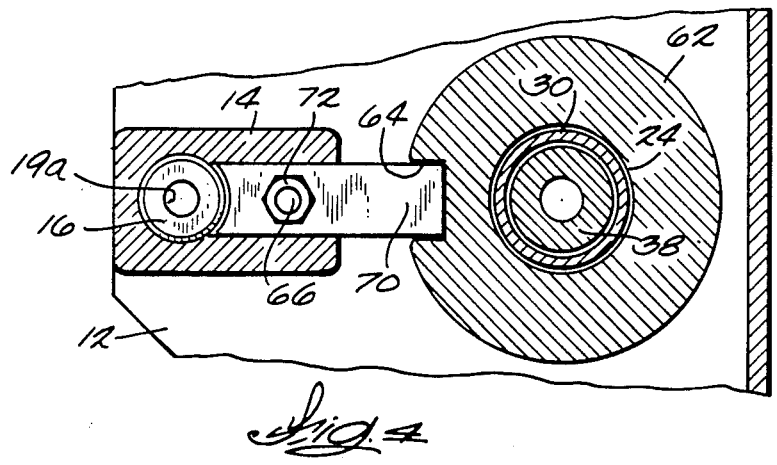
FIG. 4 is a cross-sectional view of the high speed toolholder of FIG. 1 taken along lines 4—4 thereof.

A catch 70, best illustrated in FIG. 4, is fastened to the end of plunger 66 beneath overhanging arm by a nut 72 so that the catch lies along a path extending radially from the retention pin to the keyway 64 inscribed in code rings 62 on input shaft 24. As illustrated in FIG. 1, when high speed toolholder 10 is positioned adjacent to spindlehead 20 so that input shaft 24 seats in the spindle 25 and retention pin 16 seats in the bore 18 in spindlehead 20 adjacent to spindle 25, a projection 74 extending from the spindlehead yieldably urges plunger 66 against spring 68 to bias catch 70 downwardly away from keyway 64. While catch 70 is biased downwardly away from keyway 64, input shaft 24 is free to rotate when rotatably driven by spindle 25. Once high speed toolholder 10 is removed from the spindlehead 20 (by the tool change mechanism of the machining center) so that plunger 66 is no longer in contact with spindlehead projection 74, catch 70 is urged upwardly by spring 68 so that the end of the catch distal from retention pin 16 firmly engages keyway 64 to lock input shaft 24 against rotation. In this way, when the toolholder is not being used in the spindle, the keyway on input shaft 24 remains in alignment with the spindle key at the key lock position so that input shaft 24 will firmly seat itself in spindle 25 when the high speed toolholder is moved adjacent to the spindle during a tool change operation.

As illustrated in FIG. 4, the end of catch 70 adjacent to retention pin 16 is made arcuate so as to be complementary to the outer diameter of the retention pin. In this way, the catch acts as a seal to prevent the compressed air ducted through the pin from leaking out through the bore in which plunge 66 is slidably disposed.

FIG. 5 illustrates a portion of an alternate preferred embodiment of a high speed toolholder 10' in accordance with the teachings of the present invention. High speed toolholder 10' is configured identically to high speed toolholder 10 illustrated in FIGS. 1 through 4 except as follows. Instead of input shank 24' of high speed toolholder 10' being straight as is the case with input shaft 24 of high speed toolholder 10 of FIG. 1, input shaft 24' of high speed toolholder 10' illustrated in FIG. 5 is tapered for insertion into a tapered spindle 25' rotatably journaled in the spindlehead 20' of the machining center. A flange 27', having a groove about the periphery thereof, circumscribes tapered input shaft 24' to enable shaft 24' to be gripped by the tool change arm (not shown) of the machining center. Like input shaft 24 of FIG. 1, input shaft 24' of FIG. 5 has a keyway catch 70 when the catch is urged into engagement with the keyway during intervals while plunger 66 is upwardly biased by spring 68. High speed toolholder 10 illustrated in FIG. 5 in all other respects is the same as toolholder 10 of FIG. 1 and operates in an identical manner to drive a high speed cutting tool from a slow speed machine tool spindle at a speed several times greater than the rotational speed of the spindle.

The foregoing describes a high speed toolholder capable of driving a small high speed cutting tool from a large slow speed spindle of a machine tool, such as an automatic tool changing machining center, at a speed several times greater than the machine tool spindle speed.

Although the embodiment of the invention has been described in considerable detail for the purpose of fully disclosing a practical operative structure incorporating the invention, it is to be understood that the particular apparatus shown and described is intended to be illustrative only and that various novel features of the invention may be incorporated and other structural forms without departing from the spirit and scope of the invention as defined in the subjoined claims.

The principles of this invention having now been fully explained in connection with the foregoing, we hereby claim as our invention.

1. In a tool head adapted to be inserted in the spindle of a machine tool and including a drive mechanism arranged to be actuated by the machine tool spindle for driving a cutter at a rate different than the rate of rotation of the machine tool spindle; a housing enclosing said drive mechanism; an input shaft journaled in said housing and adapted to be coupled to the machine tool spindle for transmitting the drive from the machine tool spindle to said drive mechanism; a hollow bore retention pin extending from said housing for engagement in a suitable opening in the machine tool for retaining said housing stationary while said drive mechanism is being actuated by the machine tool spindle and for communicating with a source of air pressure in the machine tool when said input shaft is coupled to the machine tool spindle for directing the air pressure through the hollow bore in the retention pin for cooling said drive mechanism in said housing; means locking said retention pin to said input shaft whenever the tool head is removed from the spindle so that said retention pin is in position to enter the opening in the machine tool when the tool head is mounted to the machine tool by an automatic tool change mechanism; and release means arranged to be actuated by the movement of the tool head as its input shaft is inserted into the spindle for releasing said locking means to permit said input shaft to be driven by the machine tool spindle relative to said retention pin.

* * * * *